Aug. 3, 1943.  R. W. MUERLE  2,325,871
CREAM SEPARATOR OR THE LIKE
Filed June 7, 1940
Fig. 1
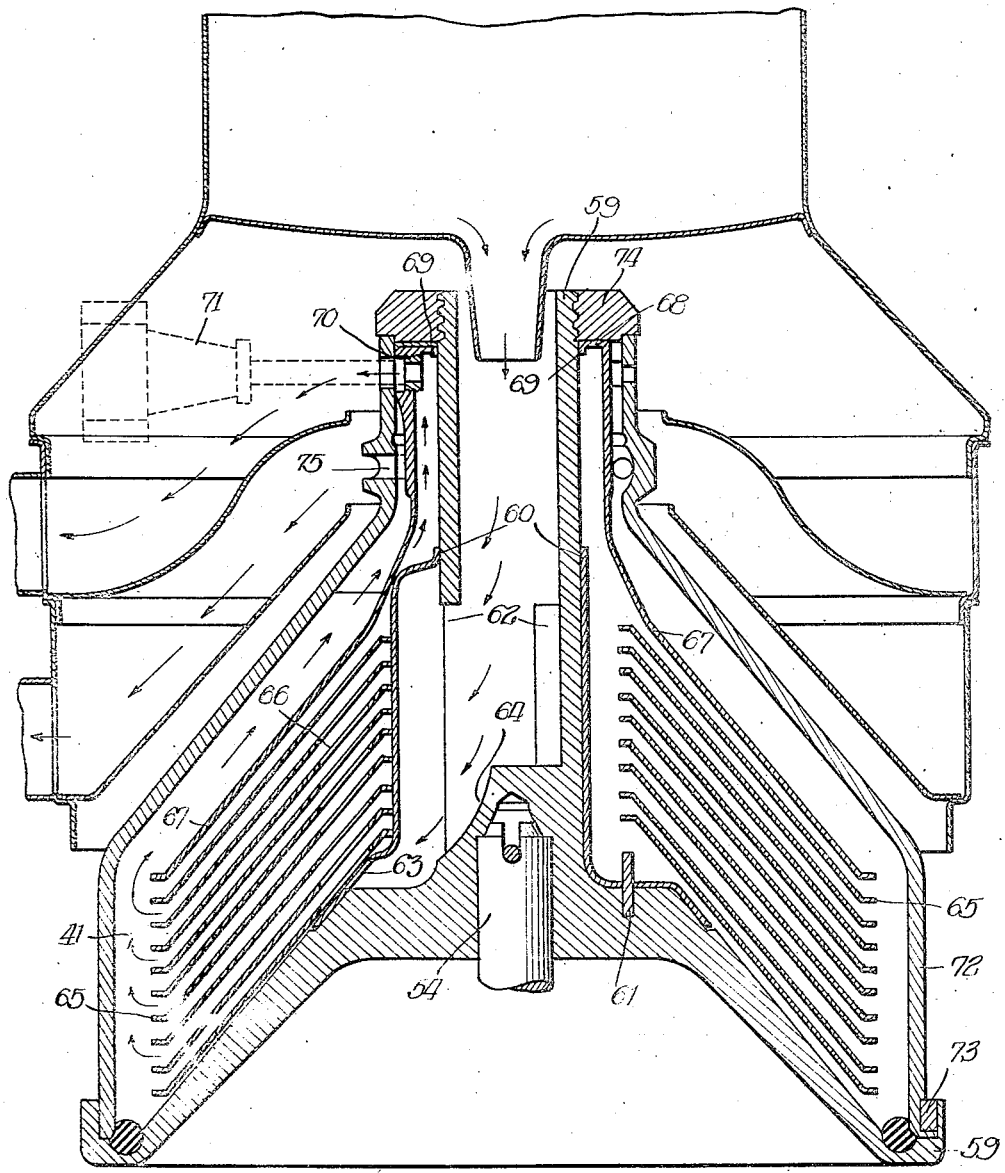
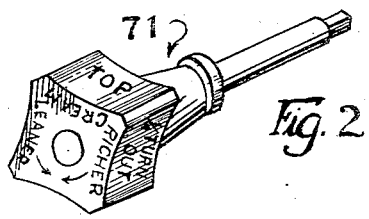
Fig. 2.
INVENTOR.
Richard W. Muerle,
BY
ATTORNEY.

Patented Aug. 3, 1943

2,325,871

UNITED STATES PATENT OFFICE 2,325,871

CREAM SEPARATOR OR THE LIKE

Richard W. Muerle, Springfield, Ill., assignor to Montgomery Ward & Co., Incorporated, Chicago, Ill., a corporation of Illinois Application June 7, 1940, Serial No. 339,264

1 Claim. (Cl. 233—46)

This invention has to do with cream centrifugal separators or the like, and especially those separators used in removing the cream from whole milk.

It is an object of this invention to provide an improved arrangement of adjusting means determining the richness of the cream. In the past, considerable difficulty has been experienced by users of cream separators because of a lack of understanding as to how to adjust the cream screw. In spite of the simple and clear instructions, it happens again and again that the operator—not realizing the sensitiveness of the device—turns the cream screw in the wrong direction or the wrong number of turns. Part of the difficulty has been due to the fact that most cream screws can be turned in (for richer cream) until the cream passage is reduced to a minimum, or even shut off completely, resulting in clogging of the bowl and complete disruption of the skimming process.

In my invention, a definite positive stop for the cream screw has been provided limiting its movement in both directions. It is not possible for the operator to turn the screw far enough to cause clogging of the bowl. The entire opening of the cream screw has been left unobstructed in order not to restrict the flow of cream through the discharge hole in the cream screw, but provision has been made permitting heavy cream to be discharged through the cream screw, after the adjustment has been turned all the way in, and the definite stop has been reached.

It is an additional feature of this invention that after the cream screw stop has been reached, it is easy for the operator to readjust the screw to a previously ascertained amount, securing the desired richness of cream, by beginning to turn the screw (from the definite stop), and turning a given number of turns. In other words it is an object to provide a means of adjusting the cream screw which has a definite starting point and may be followed by simple instructions to the operator.

It is an object of this invention to provide a tool indicating the exact amount of adjustment when the operator adjusts the cream screw.

Other objects and advantages of the invention will appear as the nature of the improvements is better understood, the invention consisting substantially in the novel construction, combination and arrangement of parts hereinafter fully described, illustrated in the accompanying drawing, and finally pointed out in the appended claim.

In the drawing:

Figure 1 is a cross-sectional view, side elevation, showing detail of a separator bowl, the skim milk cover, cream cover, and a portion of the regulating cover, the spouts being broken away on the skim milk cover and the cream cover, and a portion of the top being broken away on the regulating cover, to clearly illustrate the cream screw and tool, which is shown in position for regulating the cream screw, the tool being in dotted lines;

Figure 2 is a perspective view of the tool used in adjusting the cream screw.

Referring in particular to Figure 1, I set out in detail the construction of the bowl 41. It comprises the core 59 keyed to the vertical drive shaft 54, which in effect forms a "base" for the bowl, and has a pipe-like portion extending upward over which seats the distributor 60, the distributor having a base portion adapted to fit over the base portion of the core 59. In the core 59 is a core lug 61 which is a part of the core base to all intents and purposes, and is for the purpose of properly positioning the distributor 60. The distributor 60 is slotted on its base portion, the slot fitting neatly over the core lug and preventing the distributor from turning with respect to the core 59. The core 59 has a plurality of slots or openings 62, through which the milk escapes as it is fed down through the core pipe. Milk passing through the slots 62 is properly distributed through a series of openings in the distributor, near the base thereof, which openings are shown as openings 63. Preferably, and for the purpose of reducing the torque, and further to prevent excess foaming, the slots 62 of the core 59 are tangential. Preferably also the bottom portions of the slots are curved downwardly so that the milk will tend to go to the bottom and be nearer the outlets of the distributor. This downward curving is indicated by the number 64.

Fitting over the core 59 and also the distributor 60 are the usual discs 65, which operate in the well known manner of separator discs. They are held against rotation with respect to the core and the distributor by means of one or more vertical columnar projections on the distributor, which projections correspond to the slots 62 on the core, and terminate in the outlets or openings 63.

The openings 63 on the distributor will be properly aligned, when everything is in place, with the holes 66, through which the cream rises to the top.

Over the discs 65 is placed a top disc 67, the top of which fits closely around the pipe portion of the core 59. Between the top disk 67 and an outer shell 72 the skimmed milk flows upwardly to a discharge orifice 75. This top disc 67 has a top collar 68, which has the inner circumferential flange portion 69, hereinafter referred to as disc collar flange 69. This flange 69 serves the very definite purposes of providing an accurate and positive cream screw stop for the adjustable cream screw 70. The arrangement whereby the cream screw is provided with this definite stop, in the form of the disc collar flange or otherwise, is one of the principal features of this invention. When the cream screw 70 is turned to the right as far as it will go, it will be against the disc collar flange 69. The cream has only a small clearance between the cream screw and the disc collar flange in such event, and therefore only the richest cream will be emitted from the opening in the cream screw.

For the purpose of adjusting the cream screw, I provide the cream screw wrench, designated 71, and set forth in detail in Figure 2. This wrench will be fully described later, but it is shown in operative position by the dotted lines of Figure 1. The wrench 71 may be turned to the left to move the cream screw 70 outwardly, the richness of the cream dropping off as the cream screw moves outwardly. Because of the fact that the flange 69 provides a positive starting place, or inward stop, the butter fat in the cream can be accurately calculated by the number of turns outwardly the cream screw is given. For example, when the cream screw is all the way in on one of the smaller separators known as a 400 pound capacity separator, and whole milk having a butter fat content of 3½ to 4½ per cent is used, the butter fat in the cream will be approximately 60 per cent. On 1½ rotations or turns from the positive stop, outwardly, the butter fat will drop to a percentage of 35 per cent. On three turns outwardly, the butter fat will drop to a percentage of 15 per cent. An accurate chart is available to determine for each grade of whole milk used the number of turns from the positive stop necessary to get a desired percentage of butter fat in the cream.

Referring again to the drawing, it will be noted that the bowl shell 72 fits over the assembly of the core 59, distributor 60, discs 65 and top disc 67, and seats on an upwardly turned ledge in the bottom circumferential flange of the core 59. The shell 72 is centered with respect to the assembly by means of a small shell centering lug 73, which fits into a groove on the flange of the core. The entire assembly is tightly fastened into place by means of the bowl nut 74, which may be tightened onto the threaded upper pipe portion of the core 59. The shield 72 prevents the removal of the cream screw when once assembled and acts as an outward stop therefor, it being understood that the tool aperture is not such as to permit removal of the cream screw therethrough.

The cream screw opening in the outer bowl shell 72 has its sides bevelled (not shown) so that cream passing through the screw 70 slides off the edges of the opening in the shell 72 without any considerable amount of foaming or drag. In other words, the opening through the shell 72 for the cream is likewise tangential.

Referring to Figure 2, I have illustrated a convenient form of wrench for use with the cream screw. For accurate manipulation, the head of the wrench is generally square in shape, and has on its edges wording and numbering showing ½ turn in, ½ turn (either in or out, and ¼ turn out. It also has on its outer end directions for rotating the screw to secure richer or leaner cream. In the drawing of Figure 2, I have shown only the top which is the starting position, the side having the numerals indicating ¼ turn out, and the end showing the direction of rotation. Obviously other appropriate wording is available, but applicant has provided in this wrench a means of determining accurately the exact amount of rotation, and if a user will follow the directions of his chart he can secure accurately the amount of richness desired in the cream. One of the principal faults of the present cream separators is the lack of accuracy in adjusting the cream screw due to the absence of a definite starting point (positive stop) and due to the inaccuracy of the wrenches and instructions in adjustment. A fraction of a turn may cause the loss of considerable butter fat into the skim milk, by providing for too rich cream. Over a period of time the ordinary dairy farmer would suffer considerable loss under such circumstances.

The end of the cream screw wrench is provided with a square or irregular portion which corresponds to a complemental opening in the end of the cream screw.

The form of the invention herein shown and described presents a preferred embodiment thereof, and delineates its adaption to practical use, but it is to be understood that the present disclosure is to be considered from the illustrative standpoint and not as imposing restriction or limitation on the invention.

While I have herein shown and described certain features of my invention, still I do not wish to limit myself thereto, except as I may do so in the claim.

I claim:

A cream regulating means for a cream separator comprising a separator bowl with a top separating disc and disc collar having an inwardly extending horizontal portion and downwardly dependent flange, and an adjustable hollow cream screw threaded through said top disc and adapted to abut against said dependent flange portion without obstructing the passage way, an irregular opening through said adjustable cream screw, the opening being adapted to receive adjusting wrench for accurate adjustment to predetermine position, thereby determining the richness of the cream, and an outer shell surrounding said top disk adjacent to said cream screw, said shell having an aperture therethrough aligned with the hollow of said cream screw, said aperture being of such size as to permit the entrance of an adjusting wrench, the edge of said opening being constructed and arranged to act as a stop against outward movement of said cream screw.

RICHARD W. MUERLE.